United States Patent [19]
Palmer

[11] Patent Number: 4,974,799
[45] Date of Patent: Dec. 4, 1990

[54] BAG STANDS

[75] Inventor: Lana R. E. Palmer, New South Wales, Australia

[73] Assignee: Gorresen's Pty. Ltd., Edgecliff, Australia

[21] Appl. No.: 376,842

[22] Filed: Jul. 7, 1989

[30] Foreign Application Priority Data

Jul. 8, 1988 [AU] Australia .............................. PI9208
Oct. 14, 1988 [AU] Australia .............................. PJ0967

[51] Int. Cl.⁵ ............................................ B65B 67/12
[52] U.S. Cl. .................... 248/95; 224/42.42; 248/291; 248/302
[58] Field of Search ............... 248/302, 303, 282, 291, 248/, 294, 95, 100; 280/33.992, 33.996; 53/390, 459; 244/42.42; 186/66, 62

[56] References Cited

U.S. PATENT DOCUMENTS

| | | | |
|---|---|---|---|
| 3,245,645 | 4/1966 | Dupler | 248/303 X |
| 4,101,107 | 7/1978 | Antoszewski | 248/294 X |
| 4,418,835 | 12/1983 | Watts | 248/100 X |
| 4,560,096 | 12/1985 | Lucas et al. | 224/42.42 |
| 4,576,388 | 3/1986 | Pope | 248/100 X |
| 4,728,070 | 3/1988 | Engelbrecht | 248/303 |
| 4,762,297 | 8/1988 | Milligan | 248/100 X |
| 4,763,808 | 8/1988 | Guhl et al. | 248/100 X |

Primary Examiner—Ramon O. Ramirez
Attorney, Agent, or Firm—Ladas & Parry

[57] ABSTRACT

A bag support to be mounted on a shopping trolley, so that the bag support will receive and retain the handle of a shopping bag so as to retain the shopping bag in an open configuration to facilitate filling of the shopping bag. The bag support includes a support member which is movable between an operative position extending across the open top of the shopping trolley, to an inoperative position located adjacent a side of the shopping trolley.

9 Claims, 4 Drawing Sheets

BAG STANDS

TECHNICAL FIELD

The invention relates to bag stands suitable for use in supermarket trolleys as a means for holding the plastic bags provided by supermarkets in which to pack items purchased from the supermarket.

BACKGROUND ART

In a number of supermarkets the checkouts are operated in a manner whereby one takes one's purchases to the checkout in a trolley and the checkout assistant, after ringing up the item on the cash register or passing it over a bar coder, places it into another trolley. After the sale is complete the purchaser is handed a number of plastic bags into which to place the goods, then take the trolley full of goods and bags to an area away from the checkout to pack the goods in order to take them away. Whilst this simplifies the job of the checkout assistant in busy, crowded supermarkets which operate in this manner it increases the workload of the purchaser who must then unload the trolley and reload the goods into bags. This situation is undesirable for busy shoppers.

It is an object of the invention to ameliorate the abovementioned disadvantages.

DISCLOSURE OF THE INVENTION

There is disclosed herein a bag support to be mounted on a shopping trolley having a pair of transversely spaced walls bordering an open trolley top, said bag support having an elongated body to extend between said side walls, said body having ends provided with engaging means to securely mount the body on said side walls said engaging means enabling movement in use of said body between an inoperative portion spaced from said open top, and said operative portion extending between said walls, at least one projection over which a handle of a shopping bag may pass to be retained thereby; and wherein said body is adapted in use to be oriented so that said projection is generally upwardly extending.

There is further disclosed herein a bag support to be mounted on a shopping trolley having a pair of transversely spaced walls bordering an open trolley top, said support comprising:

a base to be mounted on one of said sides so as to be held relatively stationery with respect thereto in use: and a hook member pivotally mounted on said base so as to be angularly movable between a retracted inoperative position adjacent said base and an operative position extending away from said base so that in use said hook member extends into said open top, said hook member being shaped to receive and retain a handle of a shopping bag, when said hook member is positioned in said operative position.

BRIEF DESCRIPTION OF THE DRAWINGS

A preferred form of the present invention will now be described by way of with reference to the accompanying drawings wherein:

In FIGS. 1 and 2 there is schematically depicted a shopping trolley 10 provided with a bag support assembly 20. The trolley 10 has side walls 2, 3, 4 and 5, and a bottom 6 together with an open top 7.

Figure 1:
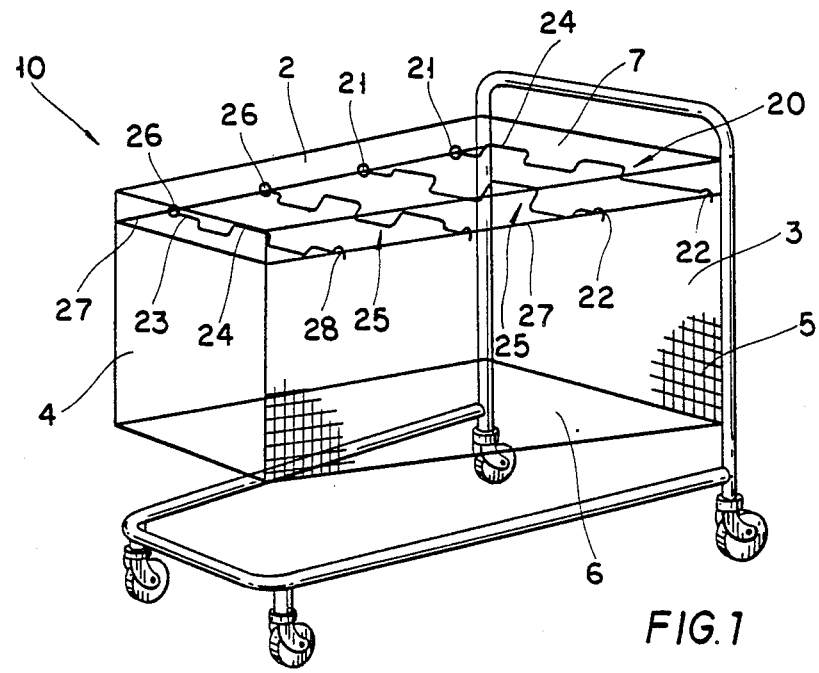
FIG. 1 is a schematic perspective view of a shopping trolley provided with a plurality of bag supports in a position to receive and support shopping bags.
Figure 2:
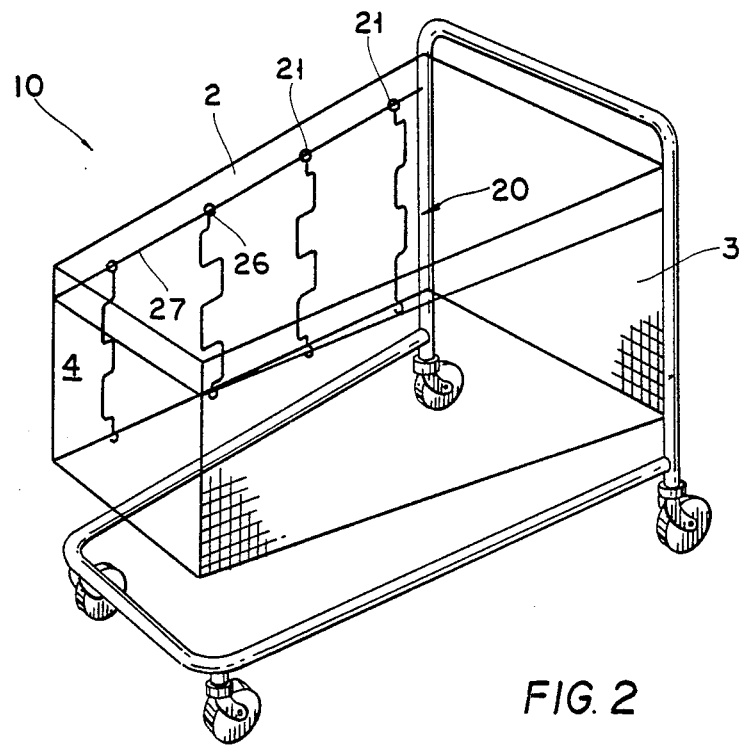
FIG. 2 is a schematic perspective view of the shopping trolley of FIG. 1 with the bag supports in an inoperative position.

The support assembly 20 includes a series of bag support members 25 which extend between the side walls 2 and 3 of a trolley 10. The bag supports 25 are formed of metal rod provided with raised projections 24 which provide a hook over which a bag handle may pass. Each end 23 of the support members 25 is provided with an eyelet 26 which encompasses one of the horizontal rods 27 forming the mesh providing the side wall 2. Accordingly the eyelet 26 inhibits rotation of the support members 25 about their longitudinal axis. The other end of each support member 25 is provided with a hook 28 to engage over one of the horizontal rods 27 of the side 3.

In operation of the above described support assembly 20, a bag may be support via its handle by one of the projections 24 or alternatively extend between adjacent projections 24 of adjacent support members 25. Preferably, the bag would be in a dimension so as to rest upon the bottom 6 of the trolley 10.

The eyelets 26 enable rotation of the support members 25 about the longitudinal axis of the associated rod 27, so that the support members 25 are movable from an operative position extending across the open top 7 to an inoperative position extending downwardly and adjacent the side wall 4. In the inoperative position, the trolley may then be stacked with other trolleys.

Figure 4:
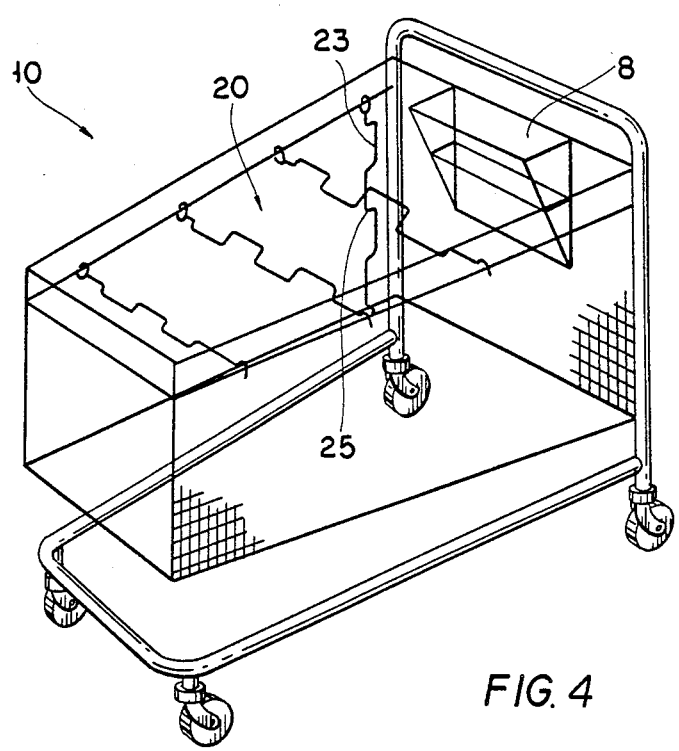
FIG. 4 is a schematic perspective view of the shopping trolley of FIG. 1 provided with a child's seat.

As seen in FIG. 4 a child seat 8 is provided and moved to is operative position, the end support member 25 may be rotated to its inoperative position while the other support members 25 extend across the open top 7.

Figure 3:
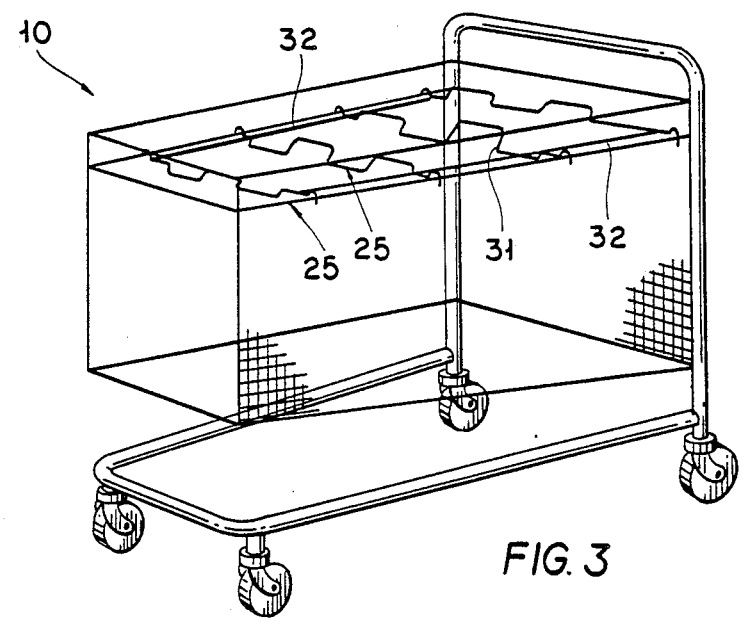
FIG. 3 is a schematic perspective view of a further trolley and bag support to that of FIG. 1.

In FIG. 3 the support members 25 are fixed to at least one rod 32 so that the support members 25 move in unison between the inoperative and operative position.

Figure 5:
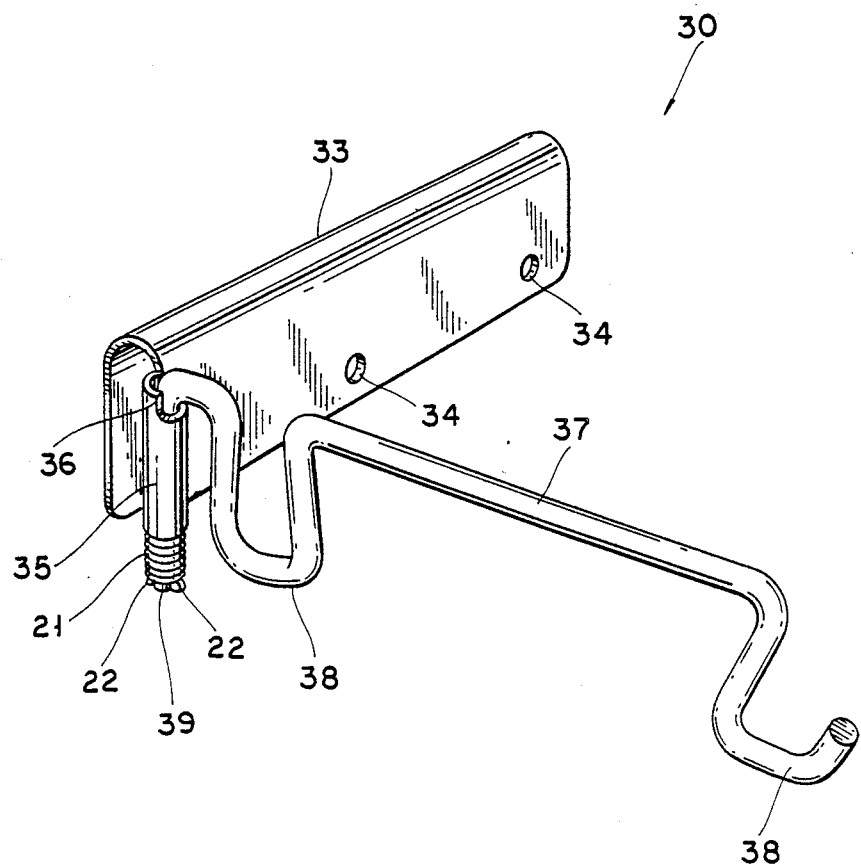
FIG. 5 is a schematic perspective view of a bag support to be used with a shopping trolley.
Figure 6:
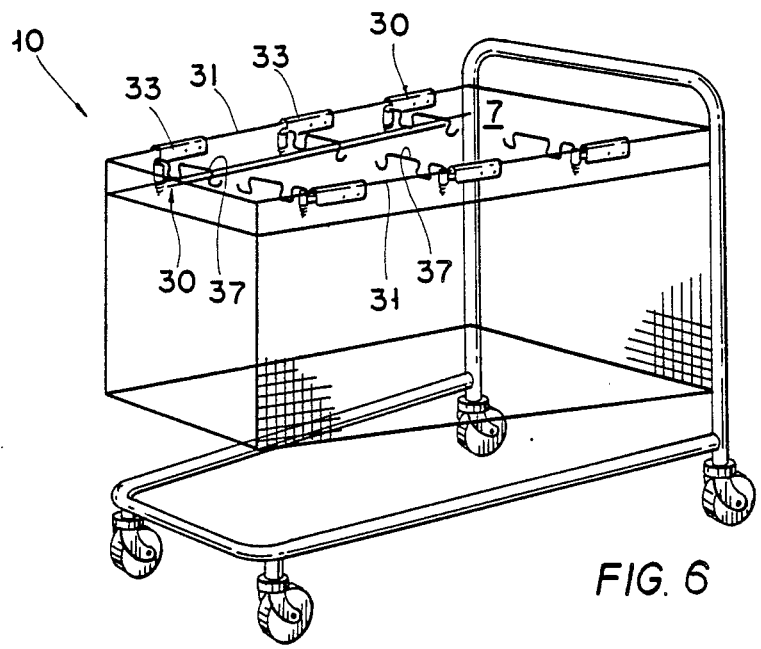
FIG. 6 is a schematic perspective view of a shopping trolley provided with a plurality of the bag supports of FIG. 1, in an operative position.
Figure 7:
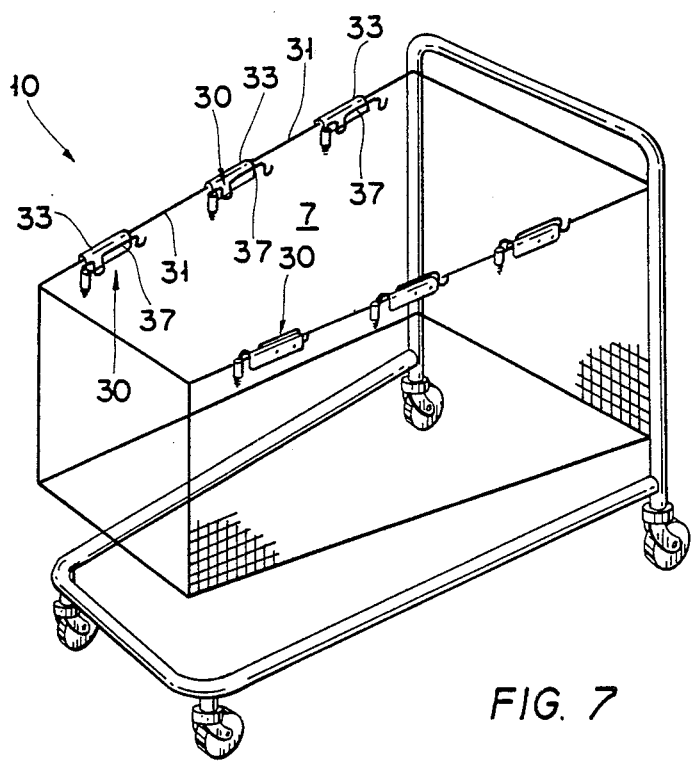
FIG. 7 is a schematic perspective view of the trolley of FIG. 6, with the bag supports arranged in an inoperative position.

In FIGS. 5, 6 and 7 there is schematically depicted bag support assemblies 30 which are mounted on the longitudinally extending side wall edges 31 of the trolley 10. Each support assembly 30 includes a base 33 of generally U-shaped transverse cross-section so as to extend downwardly over the associated trolley side wall 2 or 3. Each base is provided with passages 34 through which fasteners such as threaded fasteners or rivots may pass to secure the base 33 to its respective side 2 or 3.

One end of the base 33 is provided with a sleeve 35 which provides a pivot for a bag support arm 37. The bag support arm is provided with hook portions 38 which engage the handle of a shopping bag. The arm 37 is also provided with a shaft 39 rotatably and slidably received within the sleeve 35 so that the arm 37 may pivot in a horizontal plane about a vertical axis defined by the sleeve 35. Preferably the lower end of the shaft 39 would be formed so as to provide lugs 22 which retain a spring 21 in a compressed state bearing against the lower end of the sleeve 35. The other end of the sleeve 35 is provided with a cam profile 36 so that the spring 21 acts to retain the arm 37 in the operative position as shown in FIG. 5, or a retracted inoperative position as shown in FIG. 7.

As seen in FIGS. 6 and 7, a series of bag support assemblies 30 are attached to the shopping trolley 10, so that a bag may extend between adjacent pairs of assemblies 30. To ensure that the trolleys are stackable and so as to completely expose the open face 7 the arms 37 are movable from a position projecting into the open face 7 to a retracted position adjacent the trolley sides.

What I claim is:

1. A bag support to be mounted on a shopping trolley having a pair of transversely spaced walls bordering an open trolley top, said bag support having an elongated body to extend between said side walls, said body having ends provided with engaging means to securely mount the body on said side walls, said engaging means enabling movement in use of said body between an inoperative portion spaced from said open top, and said operative portion extending between said walls, at least one projection over which a handle of a shopping bag may pass to be retained thereby; and wherein sad body is adapted in use to be oriented so that said projection is generally upwardly extending.

2. The bag support of claim 1, wherein said body is formed of metal rods bent at spaced locations along its longitudinal axis so as to provide said projections.

3. The bag support of claim 2, wherein one end of said rod is provided with an eyelet which engages the shopping trolley to prevent rotation of the rod about its longitudinal axis so that each projection is generally upwardly extending.

4. In combination a shopping trolley and a plurality of bag supports as defined in claim 1 with the bag supports extending transverse of the trolley and spaced from each other so that a shopping bag may be suspended between adjacent pairs of bag supports.

5. A bag support to be mounted on a shopping trolley having a pair of transversely spaced walls bordering an open trolley top, said support comprising:
 a base to be mounted on one of said sides so as to be held relatively stationery with respect thereto in use; and
 a hook member pivotally mounted on said base so as to be angularly movable between a retracted inoperative position adjacent said base and an operative position extending away from said base so that in use said hook member extends into said open top, said hook member being shaped to receive and retain a handle of a shopping bag, when said hook member is positioned in said operative position.

6. The bag support of claim 5, wherein said hook member is pivotable about a vertical axis so as to be movable in a generally horizontal plane between its operative and inoperative positions.

7. The bag support of claim 6, wherein said base has a sleeve, and said hook member has a shaft portion received within said sleeve enabling pivoting about said axis.

8. The bag support of claim 7, further including resilient means to retain said hook member in either of said positions.

9. In combination, a shopping trolley and a plurality of bag supports according to claim 8, wherein the bag supports are arranged in opposing pairs on opposite sides of the shopping trolley, with the pairs being located at spaced locations along the length of the trolley.

* * * * *